Figure 1:
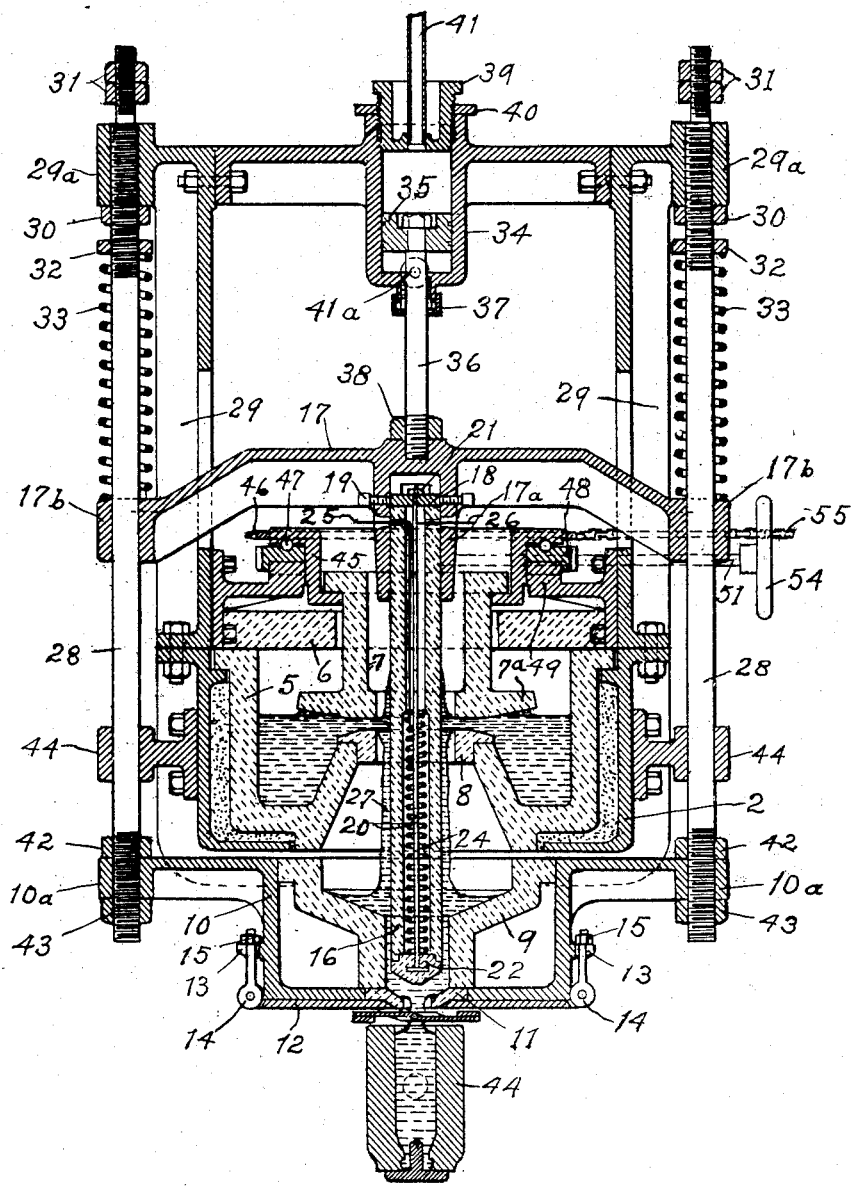

Dec. 22, 1942.  O. SHACKELFORD  2,305,739
APPARATUS AND METHOD FOR CHARGING MOLDS WITH MOLTEN GLASS
Filed May 9, 1939  3 Sheets-Sheet 1

INVENTOR
Oris Shackelford

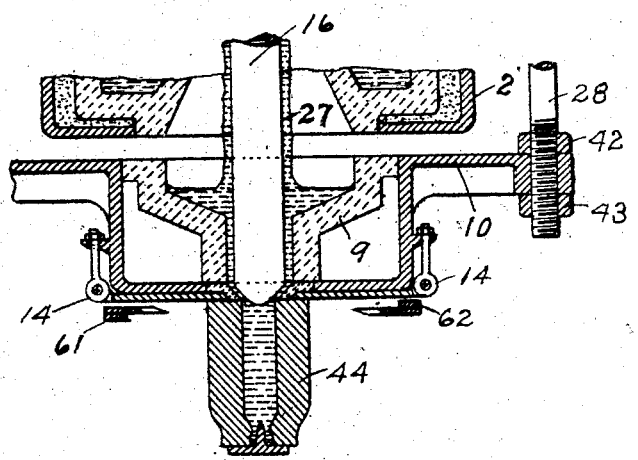
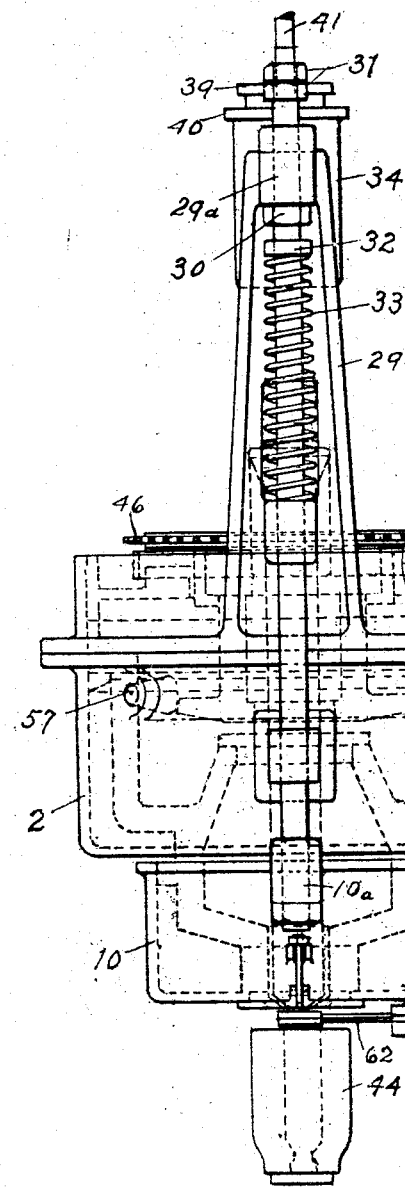
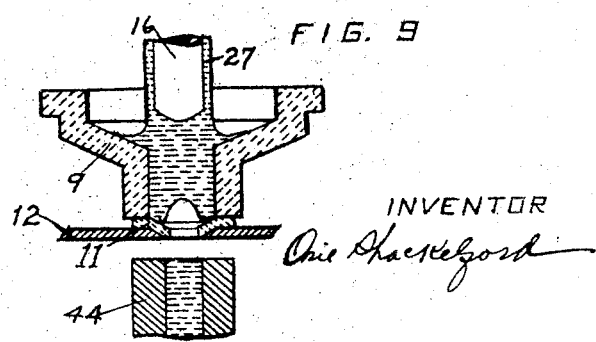

Dec. 22, 1942.  O. SHACKELFORD  2,305,739
APPARATUS AND METHOD FOR CHARGING MOLDS WITH MOLTEN GLASS
Filed May 9, 1939  3 Sheets-Sheet 3

INVENTOR
Orie Shackelford

Patented Dec. 22, 1942

2,305,739

UNITED STATES PATENT OFFICE 2,305,739

APPARATUS AND METHOD FOR CHARGING MOLDS WITH MOLTEN GLASS

Orie Shackelford, Fairmont, W. Va.

Application May 9, 1939, Serial No. 272,736

16 Claims. (Cl. 49—5)

My invention relates to methods and means for delivering uniform charges of molten glass by extrusion through an orifice and directly into the molds of a glass forming machine.

In the employment of methods and means now in common use serious defects are encountered, such as lap marks, shear marks, uneven wall thickness and surface marks due principally to the high viscosity of the molten glass which is vitally important, and a necessity in the suspended drop method.

The preformed suspended drop, being exposed to the atmosphere, rapidly acquires a chilled surface and as in most cases chutes and deflectors are necessary to properly guide it into the mold, the chilled surface, with greatly increased viscosity, is roughened and further chilled on the side contacting with the chute and deflector. This condition tends to cause unsightly marks on the exterior surface of the pressed or blown articles which is difficult and sometimes impossible to prevent. In such chutes it is always necessary to spray the inner surface with water in order to prevent the molten gobs from adhering thereto. This causes further chilling and an increase of the adverse conditions above referred to.

The object of my invention lies principally in providing means by which the above described adverse conditions are eliminated with a consequent improvement in the manufactured ware. A further advantage over the suspended drop type of feeder resides in the fact that the mold charges are measured volumetrically and are in no way affected by the temperature of the charge. A still further advantage is found in the fact that, within certain limits, blank molds of various sizes and shapes may be used on the glass forming machine at the same time, each mold receiving its proper charge—a condition which is not attainable in the suspended drop method. In this case it is necessary only to gage the flow into the receptacle to correspond to one revolution of the mold table, the small molds causing an increased up-flow in the well around the plunger and the large molds a decreased flow.

While I utilize the natural flow of the molten glass through an annular opening into an intermediate receptacle I do not measure the mold charges precisely by the rate of flow into the receptacle but rather by the displacement caused by a reciprocating plunger in a cylindrical downwardly extending part of said receptacle causing the glass to be extruded into the mold both by gravity and the plunger displacement. In case that the rate of flow into the intermediate receptacle is greater than that required by the output of the forming machine the surplus is temporarily stored in an upper portion of the receptacle which is enlarged so as to contain a considerable volume, the surface of the glass therein contained being visible to the operator, in the event that the surface rises unduly therein. A deficiency in the rate of flow into the receptacle will likewise be apparent to the operator, by a consideration of the formation of the glass adhering to the plunger. Since the receptacle is always spaced from the undersurface of the forehearth, visual inspection of the condition of the molten glass is always possible.

An outstanding difficulty in the operation of the suspended drop type of feeder lies in the regulation of the flow in given intervals of time upon which the weight uniformity of the ware exclusively depends. In my method, while the weight uniformity is independent of the described rate of flow, I provide rotative means by which the rate of flow is controlled both by the variation of the size of the opening into the receptacle and more precisely by varying the speed and consequently the centrifugal force exerted upon the thin layer of molten glass lying between the rotor and a flow ring spaced a variable short distance below it. It will be readily seen that this means of precision in the rate of flow insures a minimum demand on the attention of the operator and furthermore that by the described methods of adjustment the flow may be made to cease entirely without plugging the orifice and incurring the danger of "freezing" the glass in the feeder which is the case in the use of other methods. As the rotor ordinarily extends but a short distance below the surface of the glass it will not affect the main body of glass around it except to retard the surface flow. Besides regulating the flow the rotor acts as an efficient skimmer to prevent any foreign matter that may accumulate upon the surface of the glass from entering the interior chamber.

Means for supplying additional heat to the glass where needed and for shearing the delivered mold charges will be hereinafter described. It is understood that the parts as shown actuated by compressed air may be timed and controlled by mechanical, electrical or other means driven by or in synchronism with the mold changing cycles of the glass forming machine.

The present application is a continuation-in-part of my prior application Serial No. 89,041, filed July 6, 1936.

Figure 4:
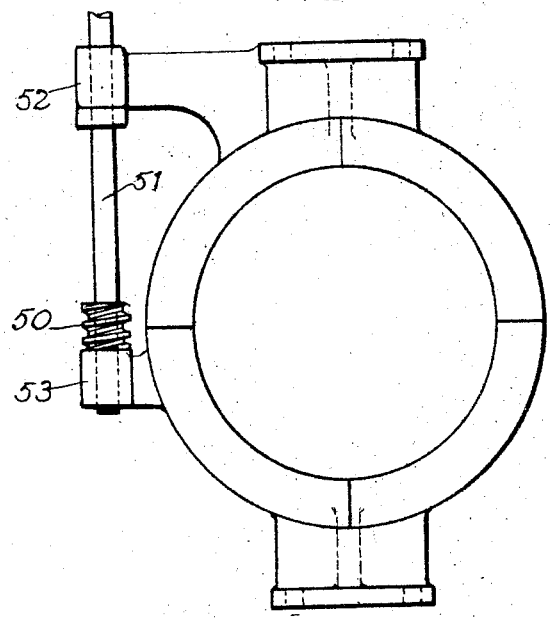
Figures 5, 6:
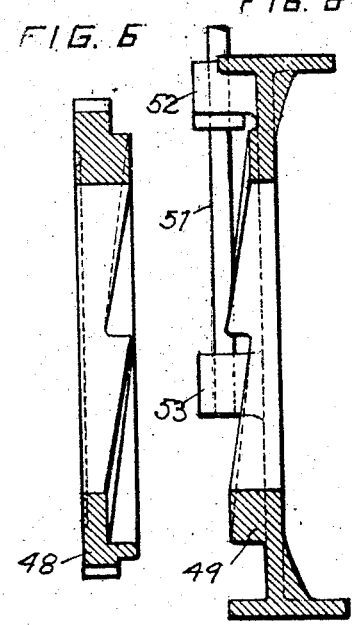
Figure 7:
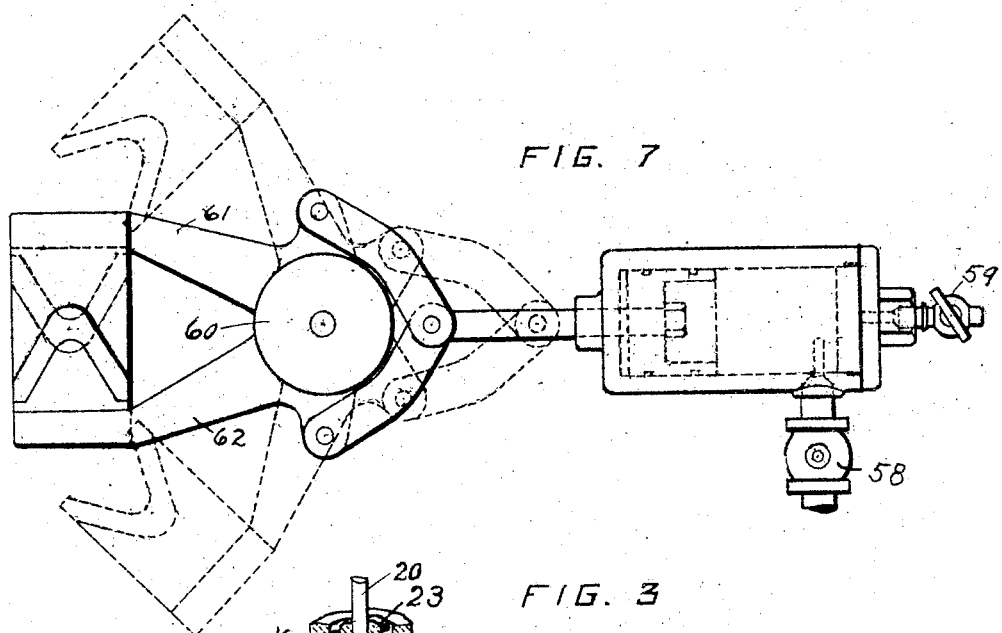
Figure 3:
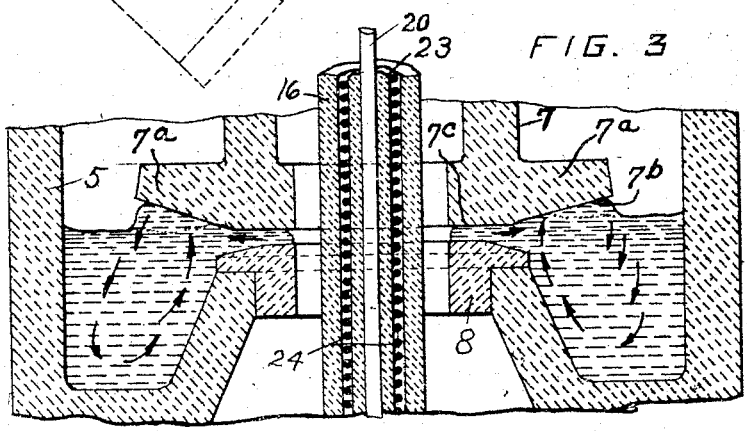

Referring to the drawings:

Figure 1 is a transverse vertical section through the center line of the reciprocating mechanism and plunger, with certain parts of the latter omitted for the sake of clarity, Figure 2 is a side elevation of the feeder and a fragmentary part of the forehearth, Figure 3 is an enlarged vertical section on the center-line showing the entrance of the molten glass into the refractory outlet, Figure 4 is a plan view of the wedge ring for vertically adjusting the refractory rotator, Figures 5 and 6 show vertical sections respectively of the wedge ring and its co-ordinate rotating member, Figure 7 shows a plan view of the shears and operating mechanism, Figure 8 is an enlarged vertical section showing the plunger at its lowest point and the shears open, and Figure 9 is a vertical section showing the plunger at its highest point of travel.

In the preferred construction the forehearth casing is built up in flanged sections 1 and nose casing 2, all securely bolted together through the flanges and supported from the floor by any suitable structure, not shown. Additional heat insulation may be secured by an outer casing of thin metal 3 and the intervening space filled with suitable insulating material on both sides and the bottom. The glass level 4 is kept approximately at the proper height by any well known method.

The forehearth nose lining 5, the cover 6, rotor 7, and bushing 8 are molded in suitable refractory material, such as pot clay, and are assembled in and supported by the iron casting 2. The receptacle 9 is molded in pot clay, or other suitable material, and is enclosed and supported by the cylindrical cast iron casing 10. The lower part of this receptacle, or well, cylindrical in form, is slightly larger than the plunger in diameter so that when the latter descends any surplus above the required mold charge will be forced upwardly through the annular space between these members. The upper portion of the receptacle is enlarged in order to provide an adequate reservoir in which there may be stored a sufficient supply of molten glass to supply any temporary deficiency, or storage for any overflow, caused by inaccuracies in the rate of flow over the flow-ring. It is observed that the glass in the receptacle reservoir and adhering to the plunger is at all times visible to the operator when the plunger and receptacle are at their lowest position.

By the described construction it is seen that in order to provide for great variation in the weights of the finished articles of glassware both the plunger and the receptacle are easily replaceable so that the plunger and measuring well diameters may be selected in accordance with the required weights of the finished articles. The plunger displacement is also varied by adjusting the range of its vertical travel.

The top of the refractory discharge orifice ring 11 is held in contact with the receptacle 9 by the clamp plate 12, the bottom of the ring being flush with the bottom of the plate. This plate is suspended from the lugs 13 through the swing-bolts 14 and tightened by the nuts 15.

In downward movement of the receptacle casing 10, and its contained and connected parts, the clamp plate contacts the top of the mold, the nuts 31 being provided to adjust the stopping of the parts in their downward movement. This downward movement is caused by the weight of these parts, including the guide rods. As the weight is more than is necessary to hold the clamp plate to the mold the excess weight is removed by screwing down the nuts 32, compressing the springs 33, until only a few pounds pressure is exerted by the plate upon the mold. At this stage a small upward travel of the crosshead will lift these parts to their upper position clearing the shear arm.

The hollow plunger 16 of refractory material is held in concentric alignment within the refractory members above mentioned. At the top of the plunger is the cast iron washer 18, tightly clamped in the socket 17a by the set screws 19. Passed through the hole in the washer the tension rod 20 extends downwardly through the plunger bore and terminates in a metallic nut which is imbedded in the refractory plunger point 22. The rod 20 is made of a metal having a high heat resistivity and is threaded at its top in the nut 21 so that the plunger tube may be tightly clamped between the plunger point 22 and the washer 18. The rod fits slidably in the refractory inner tube 23, Fig. 3, and is thus protected to a certain degree from the heated members surrounding it. As the tensile strength of the rod is considerably greater than that of the plunger tube under the high temperature, the danger of the tube becoming fractured and pulling apart is practically removed. In the annular space between the inner tube and the inside surface of the outer tube there is placed the electric heating element 24 in the form of a coil having its lower end attached to the metallic rod 20 and its upper end 25 extended to form one terminal while the second terminal 26 may be secured to and extended from the top of the rod as shown in Figure 1. The purpose of this heating element is to adjustably raise or lower the temperature on the outer surface of the plunger tube 16 in order that the film of molten glass 27, flowing downward thereon, may be kept at a desired state of fluidity.

The crosshead 17, carrying the plunger as above described, terminates in the bearings 17b which are slidably mounted upon the guide rods 28. These rods pass slidably through sleeve brackets 29a, integrally cast with the fixed standards 29. Their upward travel is adjustably limited by the stop-nuts 30 and their downward travel by the contact of the nuts 31 with the sleeves 29a. Nuts 32 adjust the compression of the coil springs 33 and regulate the degree of lost motion between the plunger 16 and the receptacle 9, since the receptacle will not commence to rise until the springs are compressed sufficiently to overbalance the weight of the receptacle and the parts mounted for movement therewith.

The compressed air cylinder 34, through its laterally extending arms is bolted to the tops of the fixed standards with its axis parallel to the guide rods. The piston 35 is firmly secured to the piston rod 36, which passes through the stuffing-box 37, and is screwed into a threaded socket centrally located in the crosshead and made fast by the lock-nut 38.

The upper end of the cylinder bore is threaded to receive the correspondingly threaded adjustable head 39 which is held non-rotatable after adjustment by the lock-nut 40. An opening at the center of the head is threaded to receive the compressed air pipe 41 and a similar opening 41a at the bottom of the cylinder wall receives a pipe for causing the upward stroke of the piston. By adjusting the cylinder head it is evident that the piston and crosshead travel can be varied within predetermined limits.

The bottom ends of the guide rods pass loosely through the sleeves 10a, integrally cast on laterally projecting arms from the casting 10, and are adjustably clamped therein by the nuts 42, 43.

The rods 28 are guided at their lower ends by the bracket slide bearings 44 which are bolted to the casing 2.

It will be seen that the vertical travel of the guide rods, together with the receptacle casing 10, is small and just sufficient for the molds of the forming machine not shown, to clear the shears carried by the receptacle casing while in the upper position as shown in Figures 1 and 2. In the lower position, as in Figure 8, the shears 61, 62 are open, the orifice ring 11 is contacting the top of the mold 44, on the forming machine which is not shown, and the plunger is just on the point of rising.

The refractory rotor 7 has an outwardly projecting flange which rests upon an inwardly projecting flange on the metal casting 45. This casting forms the hub of the sprocket wheel 46 which has on its lower side a race adapted to rotate upon the bearing balls 47. The wedge ring 48 has on its top side a ball race registering with the upper race on the sprocket wheel and on its lower side a plurality of sector wedges, integrally cast as in Figure 6, which are adapted to slide circumferentially upon similar sector wedges on the top of the fixed ring 49. Upon the periphery of the ring 48 are teeth which are adapted to engage the worm 50, Figure 4, these teeth being cut similar to those upon a helical gear wheel so that the worm will properly engage them when the ring 48 is raised or lowered within predetermined limits. The worm is keyed to the shaft 51, journaled in the bearings 52, 53, with the hand wheel 54 on the outer end. Rotating the worm causes the wedge surfaces of the ring 48 to slide circumferentially upon those of the ring 49 which action causes the sprocket 46, hub 45 and rotor 7 to be raised or lowered correspondingly. The sprocket wheel is driven by the chain 55 from a drive sprocket, not shown, the rotative speed of which is controlled by any well known speed variator, to vary the effective centrifugal force imparted to the glass by the lower end of the rotor 7. By reference to Figures 1, 2 and 3, it will be noted that, at its lower end, the rotor 7 is provided with an outwardly projecting annular flange 7a, having an inverted, frusto-conical lower surface 7b, joining a central, plane, annular bottom face portion 7c.

As indicated above, the degree of immersion of the rotor 7 and its speed of rotation can be controlled at will. In Figure 3, the rotor is shown as entirely cutting off the flow of glass from the forehearth into the pot 9. The outwardly projecting flange 7a is of material assistance in stopping or otherwise controlling the inward flow of the glass, and in circulating the glass in the forehearth. As indicated by the arrows in Figure 3, centrifugal force is imparted to the glass in contact with the bottom face of the rotor, with the result that the glass flows outwardly. Since molten glass has pronounced adhesive properties, the inclined surface 7b carries a portion of the glass upwardly and outwardly above the surface of the supply body in opposition to the tendency of the glass to flow under the influence of gravity toward and through the ring 8. The glass which is thus moved upwardly and outwardly is discharged from the periphery of the flange 7a, where it again joins the main body of glass, thereby setting up a flow in the forehearth substantially as indicated by the arrows in Figure 3. When the speed of rotation of the member 7 is decreased, this flow is modified somewhat, and a controlled amount of glass will flow, under the influence of gravity, through the ring 8 into adhesive contact with the plunger 16, as indicated at 27 in Figure 1.

The shears are shown as actuated by a cylinder and piston for compressed air in which the air is admitted through the hand operated valve 58. The speed of the shear closing may be regulated by this valve as well as by bleeding air through the stop cock 59. The return of the shear blades to the open position is effected by the reaction of a flat spiral or clock spring enclosed in the case 60 and so connected that the shear arms 61, 62 will be thrown to the position shown in dotted lines in Fig. 7 when the air pressure is removed.

In operation when compressed air is admitted through the opening 41a, with the reciprocating parts as shown in Fig. 8, the piston rises carrying with it the crosshead and plunger. When it has risen to the point shown in Fig. 1 the compression in the springs is sufficient to lift the weight of the rods and the parts supported by them by reaction against the nuts 32, the stop-nuts 30 limiting the upward travel. At this instant the shears act, cutting through the thin neck of hot glass which is drawn from the charge in the mold by the upward pull of the plunger, the shear blades receding immediately after cutting. After reaching the position shown in Fig. 1 the piston continues rising to the end of its travel, the crosshead further compressing the spring and drawing the plunger to the position shown in Fig. 9 which completes the cycle of operation. Any appropriate timing apparatus may be used to control the periodic rotation of the forming machine mold table and to actuate the plunger and shear pistons, each at its proper time, so that they are all in synchronism. It is understood that purely mechanical or electrical actuating devices, or a combination of the two, may be substituted for the air cylinders shown without affecting the operation of the glass feeding parts. When it is desired to lengthen or shorten the vertical travel of the receptacle casing 10 to suit the variable heights of the machine molds the down-stroke stop-nuts 31 are raised or lowered to suit the conditions, the stop-nuts 30 remaining unchanged.

In this feeder the mold charges do not vary in weight as the mold is filled each time by the extruding glass below the plunger and cut off at precisely the same place each time. Unlike the suspended drop type of feeder the mold charge is independent of the rate of flow over the flow ring and the duty of the operator is to see that the level in the receptacle 9 is kept within certain limits, allowing considerable latitude. The shears sever the neck between the plunger and mold charge while the plunger is rising, after which the glass is drawn up into the well a short distance and the lower neck stub levels in the mold as in Fig. 9. Gas jets of conventional type, not shown, may be arranged to play upon the surface of the glass in the receptacle if desired, the burned gases escaping through the space between the top of the receptacle 9 and the bottom of the nose lining 5, this space being variable by adjustment of the stop-nuts 30, but never entirely closed. The gases also may flow upward around plunger 16 and through the flow ring 8 before the glass starts to flow, to assist in preheating these members for the reception of molten glass when permitted to flow under gravity from the forehearth in contact therewith. The forehearth burners 56, 57 are placed to suit the required conditions and the stack, not shown, is located near the junction of the forehearth with the tank.

I claim:

1. In a molten glass feeder, a forehearth in working relation to a supply of molten glass, a vertically reciprocable plunger near the end of said forehearth remote from the supply, a flow-ring surrounding said plunger and having its top surface submerged in the glass but spaced from the forehearth floor, a rotatable member above and concentric with the flow-ring, the bottom of said member being immersed in the molten glass to permit a flow of the glass over and through said ring into adherence with the plunger, a receptacle encompassing the plunger and adapted to receive the flow of glass from the surface of the plunger, a measuring well at the bottom of said receptacle, an orifice ring at the bottom of said well adapted to register with a machine mold during the downward travel of the plunger for charging the mold, and means for severing the neck of molten glass connecting the charged mold and the orifice ring after the plunger has risen to a predetermined height, internal means for applying heat to the plunger and means for reciprocating said plunger and for rotating said member.

2. In a molten glass feeder, a forehearth in working relation to a supply of molten glass, a vertically reciprocable plunger, an annular flow orifice comprising a flow-ring with its top surface submerged in the glass and a rotatable member above and concentric with the flow-ring, the bottom of said member being immersed in the molten glass, whereby a controlled flow of the glass between the member and the flow-ring into adherence with the plunger is effected, a receptacle concentrically encompassing the plunger and adapted to receive the flow by gravity from the outer surface of the plunger, a measuring well at the bottom of said receptacle, a discharge orifice ring at the bottom of the well adapted to register with a machine mold during the downward travel of the plunger as the glass extrudes through the orifice for charging the mold, and means for severing the neck of molten glass extending between the charged mold and the discharge orifice ring after the plunger has risen to a predetermined height.

3. In a molten glass feeder, a forehearth in working relation to a supply of molten glass, a vertically reciprocable plunger, means for effecting a flow and extrusion of glass concentrically encompassing said plunger and comprising a rotatable, vertically adjustable member adapted to contact the surface of the molten glass, and a submerged flow-ring positioned below the member and permitting an inward and downward flow of glass into contact and adhesion with the plunger, thereby depositing a layer thereon which flows downward by gravity, a receptacle having an enlarged upper bowl for temporary storage and at the bottom a well having a clearance with the plunger sufficient to pass a desired amount of glass upwardly to the bowl or downwardly through a discharge orifice, the plunger and well producing an extrusive force which, assisted by gravity, causes sufficient pressure through the discharge orifice to properly fill the mold of an associated forming machine, means for depressing the receptacle to place the margins of the orifice into contact with the mold at the beginning of the downward travel of the plunger and for lifting the receptacle a short time after the beginning of the upward travel of the plunger and means for shearing the neck of molten glass normally remaining after a mold filling operation, between the orifice and mold at the completion of the upward travel of the receptacle.

4. A feeder for delivering charges of glass from a forehearth having an opening in its floor, comprising a pair of vertically disposed guide rods mounted for limited vertical movement with respect to the forehearth, a crosshead slidable on said rods, power means for raising and lowering the crosshead, spring connections between the crosshead and rods to transmit limited vertical movements to the rods, a receptacle having a discharge orifice in its bottom carried by the rods and positioned to receive glass flowing from said opening in the forehearth, a plunger carried by said crosshead and projecting downwardly through said opening into said receptacle, abutment means for limiting the vertical movement of the rods and the receptacle as the crosshead and plunger continue to move, and shearing means adapted to be projected under said discharge orifice when the receptacle is in the raised position.

5. A glass feeder for controlling the delivery of mold charges from a forehearth, comprising a pair of guide rods mounted for limited vertical movement with respect to the forehearth, a receptacle carried by the rods below the forehearth, a crosshead slidable on the rods, compression spring connections between the crosshead and the rods, power means for reciprocating the crosshead, the rods and the receptacle vertically, means for limiting the upper and lower extent of vertical reciprocations of the rods without affecting the corresponding limits of movement of the crosshead, a plunger carried by the crosshead and extending downwardly through the forehearth into said receptacle, and a rotatable member positioned to control the flow of glass from the forehearth to the receptacle.

6. A glass feeder comprising a forehearth having in its floor, a hollow upwardly extending projection provided with a glass delivery opening in its upper end, a vertically reciprocable plunger extending through said opening, manually adjustable means for controlling the amplitude of reciprocation of the plunger, a rotatable member surrounding said plunger and having its lower end immersed in the glass in the forehearth and spaced above the margins of said opening, means for adjusting the vertical position of said rotatable member, a vertically movable receptacle having its upper end spaced below said opening in said forehearth and aligned with said opening, said receptacle having a discharge orifice at its lower end adapted to substantially contact with the open upper end of a mold to be filled, shears adapted to be projected to a position beneath the discharge orifice, and means for raising the receptacle to provide a space between the receptacle and the mold for the inward projection of the shears.

7. In a molten glass feeder a vertically reciprocable plunger in combination with and encompassed concentrically by a hollow upward extension from a forehearth trough, a rotatable member, means for adjusting the vertical position of said member above the upper surface of said extension to control the rate of flow of glass by gravity through the space between the member and the extension into contact with the surface of the plunger, a receptacle below said forehearth having at its top an enlarged portion and at its bottom a cylindrical displacement well of predetermined larger inside diameter than the outside diameter of the plunger, a discharge orifice ring contacting said displacement well, means for adjusting the amplitude of travel of the plunger and for adjusting the height of the said receptacle and discharge orifice ring with reference to the path of travel of the plunger.

8. In a molten glass feeder a vertically reciprocable plunger comprising a refractory tube, a coiled heating element therein, a refractory core within said element, a heat resisting metal rod disposed interiorly of said core, a refractory cap at the bottom of said tube, the rod being attached to the cap at its lower end, and means at its upper end for tensioning the rod, thereby placing the refractory tube in compression and thus lessening the liability of its breakage.

9. The method of feeding molten glass to the molds of a forming machine which comprises flowing a stream of molten glass through an annular discharge orifice, adhering the glass to and flowing the same downwardly along the outer surface of a cylindrical plunger, controlling the flow of glass through said orifice to said surface by subjecting the upper surface of the glass above the orifice and radially outwardly thereof to centrifugal force, collecting the glass flowing along said cylindrical surface in a pool below said discharge orifice, depressing the plunger and thereby forcing the glass downwardly into a parison mold positioned therebelow, displacing a portion of the glass in the pool which is not received by the filled mold upwardly in said pool, separating the pool and the filled mold by relative movement thereof, severing the connecting neck of molten glass between the filled mold and the pool, and retracting the portion of the severed neck connected to the pool upwardly into heat exchange relation to the pool by raising the plunger, and reheating the same thereby.

10. The method of feeding molten glass to the molds of a forming machine which comprises flowing a stream of molten glass through an annular discharge orifice, adhering the glass to and flowing the same downwardly along the outer face of a cylindrical surface, controlling the flow of glass through said orifice to said surface by subjecting the glass above the orifice to centrifugal force and by varying the effective area of said annular discharge orifice, collecting the glass flowing along said cylindrical surface in a pool below said discharge orifice, forcing the glass downwardly by plunger action into a parison mold positioned therebelow, displacing a portion of the glass in the pool which is not received by the filled mold upwardly in said pool, separating the pool and the filled mold by relative movement thereof, severing the connecting neck of molten glass between the filled mold and the pool, and retracting the portion of the severed neck connected to the pool upwardly into the pool by plunger retraction and reheating the same therein.

11. The method of feeding molten glass in a measured charge into the mold of a forming machine, which comprises establishing a regulated centripetal gravity flow of glass in annular form in adhesive contact with a vertically movable flow surface, collecting the glass in a pool in a receptacle having a discharge orifice in its bottom, bringing the margins of the orifice substantially into contact with a mold, positively forcing glass from said pool downwardly through the orifice into the mold and displacing an excess of glass in the pool upwardly therein, separating the margins of the orifice from the mold by relative vertical movement of the receptacle and mold after filling the mold, thereby leaving a connecting neck of glass between the margins of the orifice and the mold, shearing the connecting neck after said separation, and applying a retractive force to the glass above the shearing plane and below the orifice.

12. The method of feeding molten glass to the molds of a forming machine which comprises flowing a stream of molten glass through an annular discharge orifice, adhering the annular stream to the outer face of a cylindrical flow surface, flowing the glass downwardly along said surface under the influence of gravity in the form of an annular column, having its inner face in contact with said surface and its outer surface unsupported and out of contact with confining walls, collecting the glass flowing from said column into a pool, and positively forcing, by plunger action, charges of glass directly from said pool into parison molds.

13. An apparatus for feeding molten glass to the receiving molds of a forming machine comprising a forehearth having a submerged discharge orifice in its floor, a vertically adjustable cylindrical gate disposed above said orifice and adapted to control the flow of glass therethrough, a vertically movable pot disposed below said floor and said orifice in position to receive glass flowing downwardly through said orifice, an implement suspended from above the forehearth extending downwardly through and in spaced relation to the margins of said discharge orifice and into said pot, said implement having its exterior surface disposed to act as an internal flow surface to which an annular column of glass flowing through the space between the margins of the orifice and the implement adheres without external confinement or support and along which said column flows downwardly by gravity to said pot, means disposed interiorly of the implement for maintaining its exterior flow surface at a sufficiently high temperature to facilitate said flow, and means for vertically reciprocating the pot and the implement in timed relation to the forehearth and to each other.

14. A device in accordance with claim 13 characterized in that the pot terminates at its lower end in a discharge orifice, that the pot is mounted for vertical reciprocating movement into and out of charging relation to a mold, and that the implement is mounted for vertical reciprocating movement with respect to the pot to control the discharge of glass through said orifice.

15. The method of charging inverted parison molds of a forming machine which comprises flowing a stream of molten glass through an annular discharge orifice, conducting the glass downwardly over the outer surface of a heated implement, collecting the glass in a pool below said discharge orifice, flowing the glass from said pool downwardly into a parison mold under the influence of gravity, positively forcing additional glass into said mold from said pool, displacing a portion of the glass in the pool which is not received by the filled mold upwardly in said pool, moving the pool bodily upwardly from the mold, severing the connecting neck between the mold and pool, and retracting the severed stub upwardly into the pool for reheating the stub.

16. A molten glass feeder comprising a container for a supply of molten glass normally maintained therein with the upper surface at a predetermined normal glass level, said container having an interiorly disposed supporting wall projecting upwardly from its floor and an orifice ring carried by said wall in upwardly spaced relation to said floor and only slightly below the glass level, a cylindrical member mounted for rotation about the axis of said orifice and having a laterally projecting flange at its lower end, the lower face of said flange being upwardly inclined toward the periphery, said face at its central portion being positioned in closely spaced relation above the margins of the orifice and substantially at said normal glass level in contact with the glass adjacent the orifice and being spaced above the glass level at its periphery, whereby, upon rotation of the implement the molten glass in adhesive contact with said face is caused to flow by centrifugal force upwardly and laterally away from said orifice.

ORIE SHACKELFORD.